E. JORALEMON.
OPERATING RAILROAD-SWITCH.

No. 182,077.    Patented Sept. 12, 1876.

WITNESSES
H. C. Merrick
M. E. Conklin

INVENTOR
Egbert Joralemon
Per Atty J. C. Rohrer

UNITED STATES PATENT OFFICE.

EGBERT JORALEMON, OF BAINBRIDGE, NEW YORK.

IMPROVEMENT IN OPERATING RAILROAD-SWITCHES.

Specification forming part of Letters Patent No. 182,077, dated September 12, 1876; application filed August 5, 1876.

*To all whom it may concern:*

Be it known that I, EGBERT JORALEMON, of Bainbridge, in the county of Chenango and State of New York, have invented a new and useful Improvement in Railroad - Switches, which improvement is fully set forth in the following specification, reference being had to the accompanying drawing.

This invention relates to the connection of the operating parts of the switch with the locomotive and tender; and consists in the combination of switch-shifting arms and switch-levers, attached to the floor of the vehicle in such a manner that said switch-shifting arms may be made to engage with the switch-rail and adjust it to the required position by the movement of the train.

Figure 1:
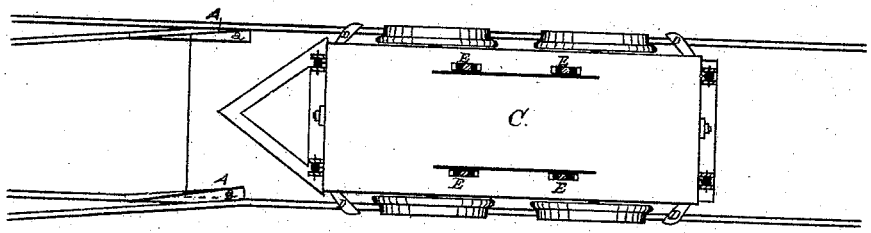
Figure 2:
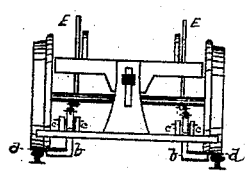
Figure 3:
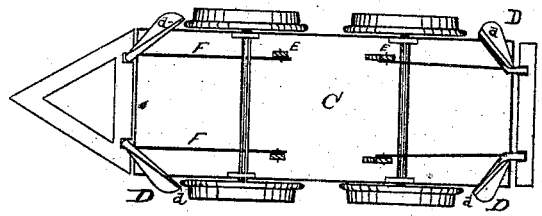
Figure 4:
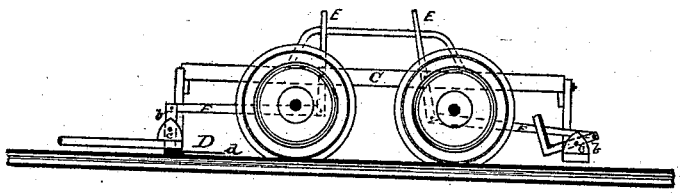

Figure 1 in the accompanying drawings is a top view of a truck, in position on the track near the switch, which is designed to represent the floor of a locomotive and tender embodying my invention. Fig. 2 is an end view of the same, showing the manner of attaching and connecting the shifting-arms. Fig. 3 is an inverted view of the same, showing the connection of the parts. Fig. 4 is a side elevation.

A is the switch-rail, which works in an inclined recess, $a$, corresponding in width to the movement of the rail, which insures additional security from displacement. Openings are made through the bottom of the recess $a$ for the discharge of any substance that might prevent the free movement of the rail. These switch-rails are connected in the usual manner. The truck C is designed to represent the floor of the locomotive and tender. D are the switch-shifting arms, which are made in the form of an elbow, the wrists $b$ of which are pivoted to lugs $c$ attached to the end of the vehicle, as shown by Fig. 2 in the drawings. The shifting-finger $d$ projects to a line with the flanges of the wheels, and is made to embrace the face and side of the switch-rail B when in operation. E E are the operating-levers, which are pivoted to the floor of the vehicle and connected with the shifting-arms D by connection-rods F, so that, by the forward movement of the lever E, the finger $d$ is depressed to engage with the switch-rail A, which, by the forward movement of the vehicle, is moved to the required position for the tread of the approaching wheels. By a reverse movement of the lever the finger $d$ is disengaged.

Having thus described my invention, what I claim as new, and desire to secure by Letters Patent, is—

The shifting-arms D, pivoted to lugs $c$, in combination with levers E, connecting-rods F, and switch-rail A, working in recess $a$, substantially as herein described, for the purpose set forth.

EGBERT JORALEMON.

Witnesses:
 NATHAN STOCKWELL,
 G. L. BABCOCK.